United States Patent [19]

Coates et al.

[11] Patent Number: 5,705,093
[45] Date of Patent: Jan. 6, 1998

[54] THERMOCHROMIC MEDIA

[75] Inventors: David Coates; Alison Linda May, both of Wimborne; Jacqueline Dawn Percy, Poole, all of Great Britain

[73] Assignee: Merck Patent Gesellschaft mit Beschrankter Haftung, Darmstadt, Germany

[21] Appl. No.: 286,181

[22] Filed: Aug. 5, 1994

[30] Foreign Application Priority Data

Aug. 6, 1993 [EP] European Pat. Off. ............ 93112629

[51] Int. Cl.$^6$ .............. C09K 19/52; C09K 19/30; C09K 19/34; A61K 7/021
[52] U.S. Cl. ............... 252/299.01; 252/299.63; 252/299.61; 252/299.66; 252/299.67; 428/1; 424/63
[58] Field of Search .............. 252/299.01, 299.61, 252/299.63, 299.66, 299.67; 428/1; 424/63

[56] References Cited

U.S. PATENT DOCUMENTS

| 4,062,799 | 12/1977 | Matsukawa et al. | 252/316 |
| 5,188,815 | 2/1993 | Coates et al. | 424/7.1 |

FOREIGN PATENT DOCUMENTS

| 61-1015 | 1/1986 | Japan. |
| 1369714 | 10/1974 | United Kingdom. |
| 86/04328 | 7/1986 | WIPO. |

OTHER PUBLICATIONS

Chem. Abstract, vol. 100 No. 165517 of JP 58/029876 A2.
Chem. Abstract, vol. 97, No. 172521 of JP 57/040581 A2.
Chem. Abstract, vol. 89, No. 215560.
Translation of JP 61-1015.
Bone et al., "Terpenoid Derivatives having a high ferroelectric . . . ", Mol. Cryst. Liq. Cryst. Letters, vol. 3(6) pp. 189–195.

*Primary Examiner*—C. H. Kelly
*Attorney, Agent, or Firm*—Millen, White, Zelano, & Branigan, P.C.

[57] ABSTRACT

An improved ink comprising a thermochromic liquid crystalline media comprising at least one optically inactive nematic component and at least one optically active component, the improvement wherein the optically active component comprises at least one menthol derivative of formula I

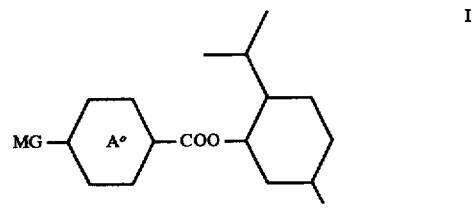

wherein

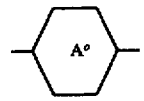

is 1,4-phenylene optionally substituted by up to 4 methyl group and/or halogen atoms, particularly fluorine atoms or is 1,4 cyclohexylene and MG is a mesogenic group, or forms a mesogenic group together with

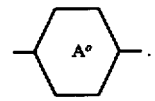

17 Claims, No Drawings

THERMOCHROMIC MEDIA

The invention relates to an improved ink comprising a thermochromic liquid crystalline media comprising at least one optically inactive nematic component and at least one optically active component, the improvement wherein the optically active component comprises at least one menthol derivative of formula I

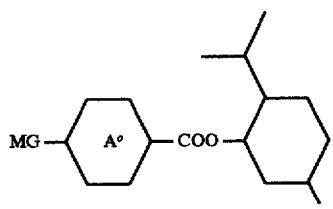

wherein

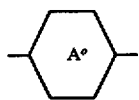

is 1,4-phenylene optionally substituted by up to 4 methyl groups and/or halogen atoms, particularly fluorine atoms, or is 1,4 cyclohexylene and MG is a mesogenic group, or forms a mesogenic group together with

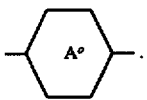

BACKGROUND OF THE INVENTION

Liquid crystal phases are exhibited by certain organic compounds and constitute an intermediate state which exists between the crystalline solid and the fully disordered liquid phase and within which certain long range ordering of the molecules takes place.

There are two broad types of liquid crystal phases; the smectic mesophase in which the long range ordering is of a substantially lamellar type and the nematic mesophase in which the ordering is substantially linear, i.e., the molecules tend to line up parallel with the long axes of the molecules. Included sometimes as a sub-class of the nematic mesophase and sometimes classified as a separate mesophase is the cholesteric mesophase. This cholesteric mesophase has a helical long range order imposed upon the linear order of the nematic mesophase. Compounds displaying a cholesteric mesophase are optically active (chiral) and the pitch of the helical twist is determined by the nature and extent of the optical activity. The pitch of the helical twist may be such that thin films of the cholesteric phase reflect visible light, resulting in the observation of bright colors, and the pitch may also be sharply temperature dependent resulting in the reflection of particular colors over particular temperature ranges so that the cholesteric mesophase in question can act as a "thermometer". This behavior is known as thermochromism.

SUMMARY OF THE INVENTION

The chiral compounds of the formula I induce a cholesteric mesophase (hereinafter designated Ch) to liquid crystalline media which possess a nematic mesophase because of their molecular shape and optical activity The compounds of the present invention exhibit, when mixed with one or more other liquid crystal compounds, a cholesteric liquid crystal phase in which the molecules are arranged in the helical formulation of that phase such that a film of the phase in the Grandjean plane texture rotates the plane of polarization of incident polarized light and reflects elliptically polarized light of specific wavelength when illuminated by ordinary light, so that the mesophases are thermochromic.

The ability of an optically active compound to induce helical pitch is measured as the helical twisting power (HTP). The HTP is defined as the pitch of the pure compound measured by extrapolation from a dilute solution (μm) induced by the chiral substance. The helical twist in a phase is greater when the value of the HTP for that substance is smaller.

The phases realized by using the present invention have properties such that they may be used in a liquid crystal electro-optic device such as a "phase change" device in which the material is changed between a so-called "focal-conic" cholesteric state, which scatters light, and a transparent nematic state by an applied electric field. Accordingly, one aspect of the present invention is an electro-optic device including in its liquid crystalline material a compound as defined above by formula (I). It will of course be realized that there may be present, a mixture, e.g., a solution, of different compounds within the scope of those defined above and that other compounds exhibiting liquid crystalline behavior may be included. Preferably the mixture of compounds used is a eutectic. The optical effect of an electro-optical device according to the invention may be enhanced by the inclusion of pleochroic dyes. Suitable pleochroic dyes for this purpose are described in UK patent Serial No. 1,555,954 and No. 1,555,955.

The materials of the present invention and mixtures thereof may thus be used in surface thermography. e.g., for the detection of breast cancer. They may also be applied in a thin film on a surface of interest, so that the color of the film in reflection at right angles to the surface indicates the temperature of the surface.

This last mentioned property may be used to produce a temperature sensitive display device, e.g., a thermometer, giving a visual display resulting from the effect of changes of temperature upon the helical pitch of the material and consequently the reflected color.

Furthermore this property may be used for decorative applications, e.g., printing inks or for cosmetics such as lipsticks, eye-shadows, rouges or make-ups.

Upon further study of the specification and appended claims, further objects and advantages of this invention will become apparent to those skilled in the art.

The compounds of the formula I are partly novel and partly known from M. F. Bone et al., Mol. Crystl. Liq. Cryst. Letters Vol. 1986 3 (6) pp. 189–195 and WO 86/04328 which disclose menthol derivatives as components of ferro-electric liquid crystals. It is well known that materials with high HTP values are required for ferro-electric liquid crystals (e.g., S. T. Lagerwall, I. Dahl. Mol. Cryst. Liq. Cryst. 1984, Vol. 114, pp. 151–1987). No one skilled in the art therefore, could recognize that the compounds of the invention have small values of the HTP making them suitable as additives for thermochromic cholesteric phases and an extraordinarily high stability against light, especially UV.

Compounds exhibiting thermochromic phases are described in U.S. Pat. No. 5,188,815, which discloses bis-methyl terephthaloate and bis-menthyl biphenyl- carboxylate.

G. S. Chilanja et al., Mol. Cryst. Liq. Cryst. Letter Vol. 3(3–4), 1986, pp. 97–102, describe that menthyl 4-nitrobenzoate shows colored cholesteric phases when mixed with a nematic mixture.

A great disadvantage for many applications of these reference materials is that they possess relatively high HTP values and have to be used in large amounts to induce a helical twist suitable for thermochromic applications. Another adverse property of phases based on these compounds is that the clearing point of the doped nematic host mixtures is depressed to very low temperatures.

Japanese Patent JP 86 1015 discloses the use of menthol esters as a component for thermochromic compositions. There is no suggestion that these compositions are suitable for the preparation of inks.

It has now been found that the compounds of the formula I, set forth herein, can substantially reduce the disadvantages mentioned above.

The compounds of formula I are, thus, outstandingly suitable as components of cholesteric phases. In particular, thermochromic inks prepared by the aid of these compounds are chemically stable, have favorable viscosity values, and broad Ch phase ranges.

Thus, the invention relates to an ink comprising a thermochromic liquid crystalline medium comprising at least one optically inactive nematic component and at least one optically active component, the improvement wherein the optically active component comprises at least one menthol derivative of formula I

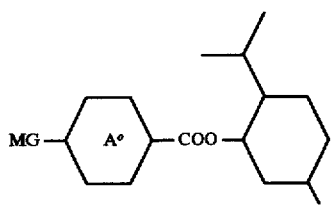

wherein

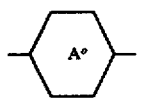

is 1,4-phenylene optionally substituted by up to 4 methyl groups and/or halogen atoms, particularly fluorine atoms, or is 1,4-cyclohexylene and MG is a mesogenic group, or forms a mesogenic group together with

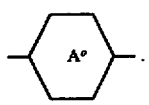

The meaning of the expression "mesogenic group", so-called "rod-like", is well-known to the skilled worker and defines a group having ring groups, bridging groups and a terminal group (cp. J. Kelker, H. Hatz, Handbook of Liquid Crystals).

Preferred embodiments are:
a) An ink wherein
MG is a group of formula II $$R^1\text{—}(A^1\text{—}Z^1)_m\text{—}A^2\text{—}Z^2\text{—}$$ (II)

wherein $R^1$ is hydrogen or a straight-chained or branched alkyl or alkenyl group of 1 to 16 C atoms, wherein one or two nonadjacent $CH_2$ groups may be replaced by —O—, —S—, —CO—O— and/or —O—CO, $A^1$ and $A^2$ each independently denote:
(a) 1,4-phenylene optionally substituted by up to 4 methyl groups and/or halogen atoms, particularly fluorine atoms, in which one or two CH groups may be replaced by N,
(b) 1,4-cyclohexylene optionally substituted by —CN or —$CH_3$, in which one or two $CH_2$ groups may be replaced by O,
(c) naphthalin-2,5-diyl or piperidin-1,4-diyl, $Z^1$ and $Z^2$ are each independently —CO—O—, —O—CO—, —$CH_2O$—, —$OCH_2$—, —N═CH—, —CH═N—, —$CH_2CH_2$—, —C≡C— or a single bond and m is 0, 1 or 2;

b) An ink wherein the optically inactive nematic medium comprises at least one compound selected from the formulae III to VII

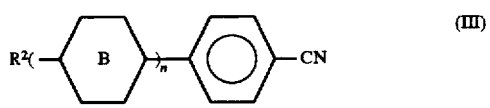 (III)

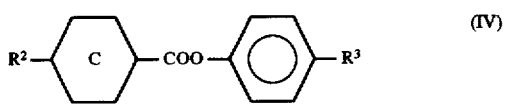 (IV)

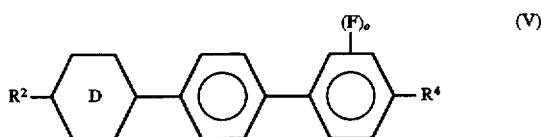 (V)

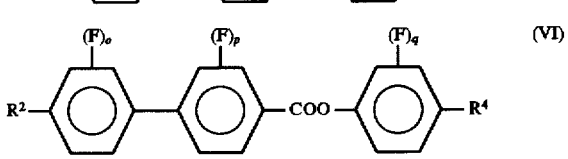 (VI)

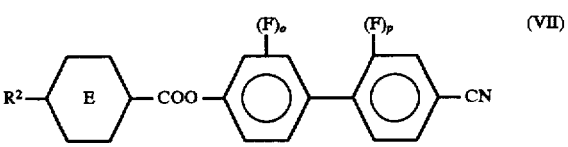 (VII)

wherein $R^2$ and $R^3$ each independently, have the meaning given for $R^1$, $R^4$ has the meaning given for $R^1$ or is halogen or cyano,

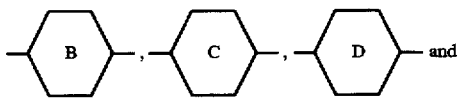

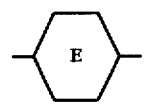

each independently denote 1,4-phenylene or 1,4-cyclohexylene, n is 1 or 2, and o, p, q are each independently 0, 1 or 2.

c) An ink wherein the thermochromic medium comprises 10–30% of at least one compound of formula I.

d) An ink wherein the thermochromic medium has an optically inactive component which comprises a racemic mixture of at least one compound selected from the formulae III to VII, wherein one of the terminal groups $R^2$, $R^3$ and $R^4$ is a chiral alkyl or alkoxy group with 4 to 16 C atoms.

e) An ink wherein the thermochromic therein is microencapsulated.

Another aspect of the invention is a substrate coated with a thermochromic ink, as defined above, characterized in that it reflects right circular polarized light and absorbs left circular polarized light; or it reflects left circular polarized light and absorbs right circular polarized light.

Furthermore the invention relates to new menthol derivative of formula Ia

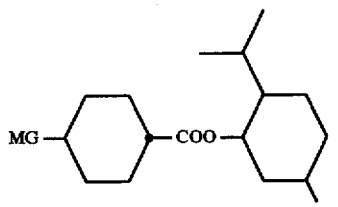

wherein
MG is a mesogenic group, in particular wherein MG is a mesogenic group of formula II defined above.

The invention is also directed to applications of the thermochromic liquid crystalline medium comprising at least one optically inactive nematic component and at least one optically active component which comprises at least one methanol derivative of the formula I, as defined above. Thus, another aspect of the invention is an electro-optic device containing a thermochromic liquid crystalline medium, as defined above. Also, contemplated is a temperature indicating device containing a thermochromic liquid crystalline medium as defined above.

A further aspect of the invention is a method of surface thermography which includes the steps of (a) applying a thin film of a thermochromic liquid crystalline medium, as defined above, to a surface and (b) observing the color of the film in reflection at an angle of 90° to the surface.

The invention relates furthermore to the use of a thermochromic liquid crystalline, as defined above, for decorative applications.

For simplicity, in the following text, Phe denotes an unsubstituted 1,4-phenylene group and PheX a 1,4-phenylene group substituted by up to four methyl groups and/or halogen atoms, Cyc denotes 1,4-cyclohexylene and Ment denotes a group of the following formula

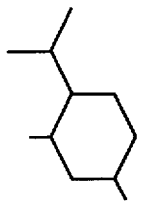

and $R^1$ and $Z^2$ are as defined for formula (I).

Preferred compounds of the formula I are those of formulae I1 to I14:

| | |
|---|---|
| $R^1$-Phe-Phe-COO-Ment | I1 |
| $R^1$-Cyc-Phe-COO-Ment | I2 |
| $R^1$-Cyc-Cyc-COO-Ment | I3 |
| $R^1$-Phe-Phe-$Z^2$-Phe-COO-Ment | I4 |
| $R^1$-Cyc-Phe-$Z^2$-Phe-COO-Ment | I5 |
| $R^1$-Phe-Phe-Phe-COO-Ment | I6 |
| $R^1$-Cyc-Phe-Phe-COO-Ment | I7 |
| $R^1$-Cyc-Cyc-Phe-COO-Ment | I8 |
| $R^1$-PhePheX-COO-Ment | I9 |
| $R^1$-CycPheX-COO-Ment | I10 |
| $R^1$-PhePhe-$Z^2$-PheX-COO-Ment | I11 |
| $R^1$-PheXPhe-$Z^2$-Phe-COO-Ment | I12 |
| $R^1$-PhePhePheX-COO-Ment | I13 |
| $R^1$-PhePheXPhe-COO-Ment | I14 |

In the compounds of the formulae I9 to I14, PheX denotes a 1,4-phenylene group substituted by up to four methyl groups or halogen atoms. Preferred are those compounds wherein PheX denotes a 1,4-phenylene group substituted by one or two halogen atoms. Particularly preferred are compounds wherein PheX denotes 2- or 3-fluoro- or 2,3-, or 2,6-difluoro 1,4-phenylene group.

When $R^1$ is an alkyl radical and/or alkoxy radical, this radical can be straight-chained or branched. Preferably, it is straight-chained and has 1, 2, 3, 4, 5, 6 or 7 C atoms and is accordingly preferably methyl, ethyl, propyl, butyl, pentyl, hexyl, heptyl, ethoxy, propoxy, butoxy, pentoxy, hexoxy, or heptoxy.

Oxaalkyl is preferably straight-chain 2-oxapropyl (=methoxymethyl), 2-oxabutyl(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

When $R^1$ is an alkenyl group, it can be straight-chain or branched. Preferably, it is straight-chain and has 2 to 10 C atoms. It is accordingly, in particular, vinyl, prop-1- or prop-2-enyl, but-1-, -2- or -3 -enyl, pent-1-, -2-, -3 - or -4-enyl, hex- 1-, -2-, -3 -, -4- or -5-enyl, hept-1-, -2-, -3-, -4-, -5- or -6-enyl, oct- 1-, -2-, -3-, -4-, -5-, -6- or -7-enyl, non-1-, -2-, -3 -, -4-, -5-, -6-, -7- or -8-enyl or dec- 1 -, -2-, -3 -, -4-, -5 -, -6-, -7-, -8- or -9-enyl.

Chiral groups with a branched terminal residue $R^1$ can occasionally be of importance because of an improved solubility in the customary liquid crystal base materials.

Branched groups of this type as a rule contain not more than one chain branching. Preferred branched residues R1 are isopropyl, 2-butyl (=1-methylpropyl), isobutyl (=2-methylpropyl), 2-methylbutyl, isopentyl(=3-methylbutyl), 2-methylpentyl, 3- methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1- methylhexoxy and 1-methylheptoxy.

The compounds of the formula (I) wherein $R^1$ is hydrogen or alkoxy with 1 to 6 C atoms do not show a mesophase on their own, but they impart a tight helical twist into a given nematic phase without influencing the range of its mesophase too much. Note that $R^1$ of formula (I) may be alkoxy when the first CH group of an alkyl or alkenyl group is replaced by O. Therefore, an embodiment of the invention relates to the compounds of formula Ib

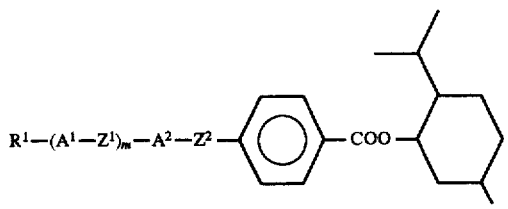

wherein

R¹ denotes H or $C_{1-6}$-alkoxy.

Furthermore, the compounds of formula I impart the mixtures according to the invention a tight helical twist. The compounds of the formula I have an HTP value of less than 0.5 μm, preferably of 0.15 μm to 0.13 μm, measured in typical basic host mixtures containing phenylbenzoates or cyano-biphenyls and cyano-p-terphenyls. For some compounds, HTP-values greater than 0.15 μm occur. These compounds are used preferably to adjust a selective reflection wavelength of a given thermochromic mixture by adding small amounts to such mixtures.

The compounds of the formula I are prepared by methods which are known per se, such as are described in the literature (for example in the standard works, such as Houben-Weyl, Methoden der Organischen Chemie [Methods of Organic Chemistry], Georg-Thieme-Verlag, Stuttgart or in WO 86/04328), and in particular under reaction conditions which are known and suitable for the reactions mentioned in more detail herein which can also be used in this connection.

If desired, the starting substances can also be formed in situ, such that they are not isolated from the reaction mixture but are immediately reacted further to give the compounds of the formula I.

The thermochromic phase liquid crystalline mixtures according to the invention consist of 3 to 25, preferably 4 to 15, components, at least one of which is a compound of the formula I. The other constituents are preferably chosen from nematic or nematogenic substances, in particular the known substances, from the classes of azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylcyclohexenes, cyclohexylnaphthalenes, 1,4-bis-cyclohexylbenzenes, 4,4'-biscyclohexylbiphenyls, phenyl- or cyclohexylpyrimidines, phenylpyridines, phenyl- or cyclohexyldioxanes, phenyl- or cyclohexyldithianes, 1,2-bis-phenylethanes, 1,2-biscyclohexylethanes, 1-phenyl-2-cyclohexylethanes, optionally halogenated stilbenes, benzyl phenyl ethers, tolanes and substituted cinnamic acids.

Preferred compounds as possible constituents of such liquid crystalline mixtures can be characterized by the formula 1

R⁴-L-G-E-R⁵      1 wherein L and E are each unsubstituted or laterally fluoro- or cyano-substituted carbo- or hetero-cyclic ring systems from the group comprising 1,4-disubstituted benzene and cyclohexane rings, 1,4-disubstituted 1-cyanocyclohexane rings, 4,4-disubstituted biphenyl, phenylcyclohexane and cyclohexylcyclohexane systems, 2,5-disubstituted naphthalene, di- and tetrahydronaphthalene, quinazoline and tetrahydroquinazoline, G is

| —CH=CH— | —N(O)=N— |
| —CH=CY— | —CH=N(O)— |
| —C≡C— | —CH₂—CH₂— |
| —CO—O— | —CH₂O— |
| —CO—S— | —CH₂—S— |
| —CH=N— | —COO—Phe—COO— | or a single bond between carbon atoms in the L and E groups, Y is halogen, preferably chlorine, or —CN and R⁴ and R⁵ are alkyl, alkoxy, alkanoyloxy or alkoxycarbonyloxy with up to 18, preferably up to 8, carbon atoms, it also being possible for one $CH_2$ group non-adjacent to an oxygen atom to be replaced by —O—, —CH=CH— or —C≡C—, or that one of the radicals R⁴ and R⁵ may also denote CN, $NO_2$, $CF_3$, NCS, F, Cl or Br.

In most of these compounds, R⁴ and R⁵ are different from one another, one of these radicals usually being an alkyl or alkoxy group. However, other variants of the substituents envisaged can also be used. Many such substances or mixtures thereof are commercially available. All of these substances can be prepared by methods which are known from the literature.

The thermochromic liquid crystalline phases according to the invention contain about 2 to 80%, preferably 2 to 70%, more preferably 2 to 50%, of one or more compounds of the formula I, and, in such amounts, can be used advantageously in the devices according to the invention.

For ease of use, neat LC mixtures may be encapsulated according to standard methods given in text books such as "Microcapsules and Microencapsulation Techniques" by MH Gutcho. An example is also given in U.S. Pat. No. 2,800,457. The capsule size of the inventive microencapsulated media is typically 8–12 μm diameter and they are made preferably of gelatin/gum arabic.

Once encapsulated the capsules can be incorporated into aqueous based binders, viscosity modifiers and surfactants, etc., and a printing ink made.

The capsules or ink made from them are then printed (usually screen printing) or coated (by bar or wire wound bar) into films of 10–30 μm thick. In this form, after drying off the water, the films are dry. Due to the structure of the capsules (oblate spheres) the angle dependence is now much less than in a thin film or pure liquid crystal. However, the color is still very similar and is more or less independent of temperature.

Furthermore, it is possible to use menthol components in cholesteric mixtures that show colorplay (change of color with temperature), and thus can be used for color-changing cosmetics, e.g., for lipsticks, eye-shadows, rouges or make-ups.

The liquid crystalline phases according to the invention are prepared in a manner which is customary per se. As a rule, the components are dissolved in one another, preferably at elevated temperature.

The liquid crystalline phases according to the invention can be modified by suitable additives such that they can be used in all the types of liquid crystal display elements.

Such additives are known to the expert and are described in detail in the literature. For example, it is possible to add conductive salts, preferably ethyldimethyldodecylammonium 4-hexyloxybenzoate, tetrabutylammonium tetraphenylboranate or complex salts of crown ethers (compare, for example, I. Haller et al., Mol. Crystl. Liq. Cryst., Volume 24, pages 249–258 (1973)) for improving the conductivity, dichroic dyestuffs for the production of colored guest/host systems or substances for changing the dielectric anisotropy, the viscosity and/or the orientation of the nematic phases. Such substances are described, for example, in German Offenlegungsschrift 2,209,127; 2,240,863; 2,321,632; 2,338,281; 2,450,088; 2,637,430; 2,853,728 and 2,902,177.

The thermochromic cholesteric liquid crystal phases according to the invention are suitable for thermometry, especially for a good indication of core body temperature in sleeping children and postoperative patients.

Furthermore they can be advantageously applied in the biomedical thermography as an important diagnostic aid for breast cancer detection or placental location.

Besides mood indicating jewelry, U.S. Pat. No. 3,802,945 (1979), and nondestructive testing applications, they can be used in atmospheric pollutant detection because of the effect of impurities on the selective reflection wavelength of the liquid crystalline phases according to the invention.

In another preferred embodiment of the present invention an ink is formulated based on heat transfer as described in EP 0 564 959 by a system comprising an encapsulated thermochromic liquid crystal containing at least one menthol derivative of formula I, a fusible polymer, a binder polymer, and water.

The following examples are intended to illustrate the invention without limiting it. Percentages above and below are percentages by weight. All the temperatures are given in degrees Centigrade. The symbols are furthermore as follows: Cr: crystalline solid state, S: smectic phase (the index characterizes the phase type), N: nematic phase, Ch: cholesteric phase, I: isotropic phase. The figure between two symbols indicates the transition temperature.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding European Application No. EP 93112629.6, filed Aug. 6, 1993, are hereby incorporated by reference.

EXAMPLES

Example 1

4'-Hexyloxybiphenyl-4-yl carbonylchloride (0.0985 m) is dissolved in a mixture of dry dichloromethane (120 ml) and triethylamine (60 ml) at 20° C. To this solution is added a solution of (1S, 2R, 5S)-menthol (0.197 m) in dry dichloromethane (60 ml), the reaction mixture is heated under gentle reflux for 2 hours. After cooling, the reaction mixture is washed with dilute hydrochloric acid solution (3×50 ml) and then with water (3×50 ml); the organic layer is dried over magnesium sulphate and evaporated to dryness. Column chromatography, using two weights of silica and two weights of alumina with an eluant mixture of petroleum spirit and dichloromethane in the ratio of 2:1, yields (1S, 2R,5S)-(+)-menthyl 4'-hexyloxy biphenyl-4-yl carboxylate mpt. 60° C.

Similarly, the further compounds in the following table are prepared.

| R | A–A | B–B | configuration | mpt. (°C.) |
|---|---|---|---|---|
| $C_6H_{13}O$ | phenyl | phenyl | (1R, 2S, 5R)-(−)- | 59.6 |
| $C_7H_{15}$ | phenyl | phenyl | (1R, 2S, 5R)-(−)- | 44.0 |
| H | phenyl | phenyl | (1R., 2S, 5R)-(−)- | 67.7 |
| H | phenyl | phenyl | (1S, 2R, 5S)-(+)- | 69.4 |
| $C_4H_9O$ | phenyl | phenyl | (1R, 2S, 5R)-(−)- | 92.9 |
| $C_4H_9O$ | phenyl | phenyl | (1S, 2R, 5S)-(+)- | 94.7 |
| $C_5H_{11}$ | phenyl | phenyl | (1S, 2R, 5S)-(+)- | 67.8 |
| $C_5H_{11}$ | phenyl | phenyl | (1R, 2S, 5R)-(−)- | 87.1 |
| $C_3H_7$ | phenyl | phenyl | (1S, 2R, 5S)-(+)- | 88.3 |
| $C_3H_7$ | cyclohexyl | cyclohexyl | (1S, 2R, 5S)-(+)- | 77.8 |
| $C_3H_7$ | cyclohexyl | cyclohexyl | (1R, 2S, 5R)-(−)- | 77.4 |

Example 2

Different amounts of inventive menthol derivatives of formula Ib1

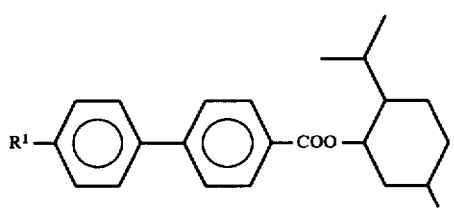

(Ib1)

are added to a mixture (coded Mixture A) consisting of

C₂H₅ —⬡—⬡— CN  10%

C₃H₇ —⬡—⬡— CN  5%

C₃H₇O —⬡—⬡— CN  10.5%

-continued

C₅H₁₁ —⬡—⬡— CN  43.3%

C₅H₁₁ —⬡—⬡—⬡— CN  10.1%

C₇H₁₅ —⬡—⬡—COO—⬡—⬡— CN  7.0%

C₅H₁₁ —⌬—⬡—⬡— CN  14.1% exhibiting a clearing point of 100° C. and Δn=0.261.

The physical properties of the resulting doped mixtures are given in Table I.

TABLE I

Properties of Thermochromic Media

| $R^1$ | configuration | concentration [%] | clearing point [°C.] | $\lambda_{max}$ [nm] | HTP [μm] |
|---|---|---|---|---|---|
| $C_6H_{13}O$ | (1S, 2R, 5S)-(+) | 10.3 | 78.1 | 1149.0 | 0.15 |
| $C_6H_{13}O$ | (1R, 2S, 5R)-(−) | 10.0 | 77.8 | 1148.8 | 0.16 |
| $C_7H_{15}$ | (1S, 2R, 5S)-(+) | 10.0 | 74.5 | 1107.4 | 0.15 |
| H | (1S, 2R, 5S)-(+) | 10.0 | 65.5 | 996.4 | 0.13 |
| H | (1R, 2S, 5R)-(−) | 9.9 | 67.3 | 984.4 | 0.13 |
| $C_4H_9O$ | (1R, 2S, 5R)-(−) | 10.3 | 74.9 | 1092.4 | 0.15 |
| $C_4H_9O$ | (1S, 2R, 5S)-(+) | 10.0 | 76.8 | 1067.0 | 0.15 |
| $C_5H_{11}$ | (1S, 2R, 5S)-(+) | 10.1 | 71.0 | 1064.0 | 0.14 |

TABLE I-continued

Properties of Thermochromic Media

| $R^1$ | configuration | concentration [%] | clearing point [°C.] | $\lambda_{max}$ [nm] | HTP [μm] |
|---|---|---|---|---|---|
| $C_5H_{11}$ | (1R, 2S, 5R)-(−) | 10.3 | 73.6 | 979.2 | 0.14 |
| $C_3H_7$ | (1R, 2S, 5R)-(−) | 10.3 | n.d. | 975.0 | 0.13 |
| $C_3H_7$ | (1S, 2R, 5S)-(+) | 10.0 | 71.2 | 983.4 | 0.13 |

Comparative Example

Mixture A of Example 2 is doped with 4.9% of bis-menthyl terephtaloate (U.S. Pat. No. 5,188,815) the resulting doped medium shows the following physical properties:

Clearing point: 77.1° C., $\lambda_{max}$=862.6 nm; HTP=0.22 μm

The prior art menthol derivative yields a higher depression of the clearing point and exhibits higher HTP values.

Example 3

A liquid crystal medium coded Mixture B consisting of:

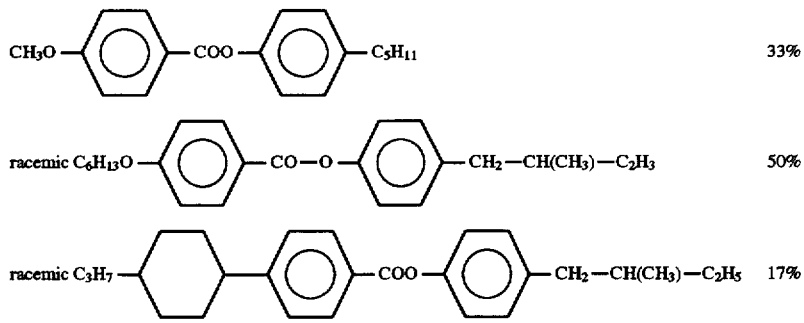

CH₃O—⬡—COO—⬡—C₅H₁₁  33% racemic C₆H₁₃O—⬡—CO—O—⬡—CH₂—CH(CH₃)—C₂H₅  50% racemic C₃H₇—⌬—⬡—COO—⬡—CH₂—CH(CH₃)—C₂H₅  17% exhibiting clearing point 91.1° C. is doped with 20% of

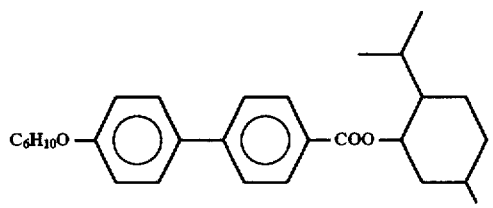

C₆H₁₃O—⬡—⬡—COO—⌬

The physical properties of the resulting thermochromic media are given by Table II:

TABLE II

| Configuration of Dopant | Clearing point (°C.) | Resulting Color |
|---|---|---|
| (1R, 2S, 5R) − (−) | 55.4 | Bright green |
| (1S, 2R, 5S) − (+) | 54.8 | Bright green |

Example 4

Printing Ink Composition Formulation

The colorant of Example 3 is emulsified into an aqueous solution of gelatine, and microencapsulated in gelatin-gum acacia coacervate according to the process of U.S. Pat. No. 2,800,457, Example 2. The capsules are hardened by the process of U.S. Pat. No. 2,800,457, Example 1. A slurry of microcapsules of mean diameter 18 μm is obtained, and added to an aqueous solution of polyvinyl alcohol (PVA) to obtain a viscous suspension containing 8% PVA and 20% liquid crystal. The suspension is applied by screen-printing to a plain board, to give a green/bright/iridescent color effect. thus, when viewed with a right circular polarizer, the board appears green, but when viewed with a left circular polarizer, it appears black.

Example 5

A mixture consisting of

| Structure | Stereochemistry | Percentage |
|---|---|---|
| $CH_3O$—⌬—COO—⌬—$C_5H_{11}$ | | 26.37% |
| $C_6H_{13}O$—⌬—COO—⌬—$C_5H_{11}$ | | 4.25% |
| $C_6H_{13}O$—⌬—COO—⌬—$CH_2CH(CH_3)C_2H_5$ | (±) | 15.04% |
| $C_3H_7$—⬡—⌬—$CO_2$—⌬—$CH_2CH(CH_3)C_2H_5$ | (±) | 8.58% |
| $C_5H_{11}$—⬡—⌬—$CO_2$—⌬—$CH_2CH(CH_3)C_2H_5$ | (±) | 8.58% |
| $C_7H_{15}$—⬡—⌬—$CO_2$—⌬—$CH_2CH(CH_3)C_2H_5$ | (±) | 4.25% |
| $C_6H_{13}O$—⌬—⌬—COO—(menthyl) | (1S, 2R, 5S) (+) | 10.0% |
| $C_4H_9O$—⌬—⌬—COO—(menthyl) | (1S, 2R, 5S) (+) | 5.0% |
| $C_3H_7$—⬡—COO—⌬—$OC_4H_9$ | | 13.6% | shows a green reflective color.

Example 6

Using the liquid crystal mixture in Example 5, it was encapsulated as in Example 4 to form capsules of mean diameter 8–10 μm and then these capsules were incorporated into a heat transfer ink system as described in EP 0 564 959.

| | % |
|---|---|
| Fusible polymer‡ | 28.72 |
| Binder polymer† | 12.4 |
| LC capsules | 33.0 |
| Water | 20.36 |
| Surfactants, antifoam agents, viscosity modifiers | 5.52 |
| | 100.0 |

‡for example a copolyamide such as GRILTEX 1 TM
†for example a polyurethane Lankrothane TM or PVA This system was screen printed onto a siliconized release paper, a commercial black ink (Sericol Texiscreen Black) plus fusible polymer over printed, dried and transferred by heat (190° C.) and pressure onto a cloth substrate to provide a durable film showing a bright green iridescent color.

What is claimed is:

1. An improved thermochromic liquid crystalline medium comprising at least one optically inactive nematic component and at least one optically active component, wherein the optically active component comprises at least one compound of formula I having one menthyl group

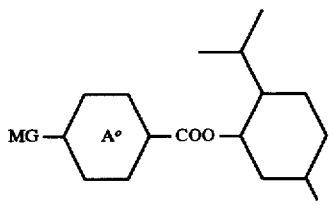

wherein

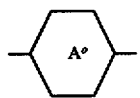

is 1,4-phenylene optionally substituted by 1 to 4 methyl groups, halogen atoms or a combination thereof, or 1,4-cyclohexylene and MG is a group of formula II $$R^1-(A^1-Z^1)_m-A^2-Z^2-$$ (II)

wherein

R$^1$ is hydrogen or a straight-chained or branched alkyl or alkenyl group of 1 to 16 C atoms, wherein one or two nonadjacent CH$_2$ groups are optionally replaced by —O—, —S—, —CO—O— or —O—CO—, independently, A$^1$ and A$^2$ each independently denote:
  (a) 1,4-phenylene optionally substituted by 1 to 4 fluorine atoms, in which one or two CH groups may be replaced by N,
  (b) 1,4-cyclohexylene optionally substituted by —CN or —CH$_3$, in which one or two CH$_2$ groups may be replaced by O,
  (c) naphthalin-2,5-diyl or piperidin-1,4-diyl, Z$^1$ and Z$^2$ are each independently —CO—O—, —O—CO—, —CH$_2$O—, —OCH$_2$—, —N=CH—, —CH=N—, —CH$_2$CH$_2$—, —C—C≡ or a single bond and m is 0, 1 or 2 and wherein the optically inactive nematic component comprises at least one compound selected from the formula III to VII

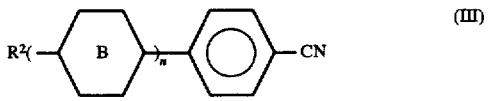

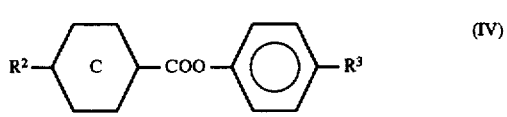

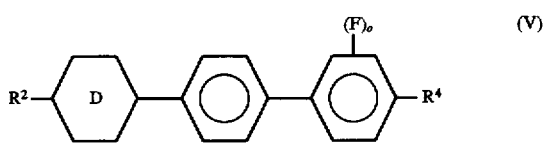

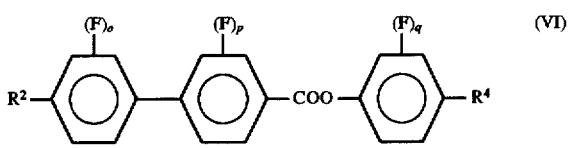

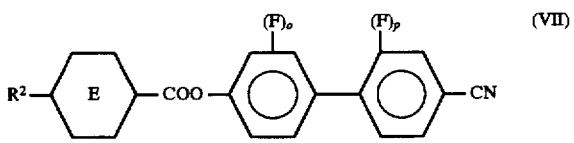

wherein

R$^2$ and R$^3$ each independently is hydrogen or a straight-chained or branched alkyl or alkenyl group of 1–16 C atoms, wherein one or two non-adjacent CH$_2$ groups are optionally replaced by —O—, —S—, —CO—O— or —O—CO—, independently, R$^4$ has one of the meanings given for R$^2$ and R$^3$ or is halogen or cyano,

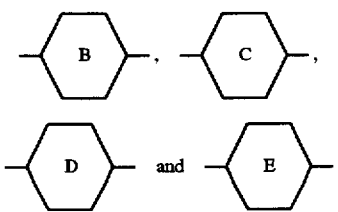

each independently denote 1,4-phenylene or 1,4-cyclohexylene, n is 1 or 2, and o, p, q are each independently 0, 1 or 2.

2. A medium according to claim 1, which is microencapsulated.

3. An electro-optic device containing a liquid crystalline medium according to claim 1.

4. A temperature indicating device containing a liquid crystalline medium according to claim 1.

5. A method of surface thermography which includes the step of
  (a) applying a thin film of a liquid crystalline medium according to claim 1 to a surface, and
  (b) observing the color of the film in reflection at an angle of 90° to the surface.

6. A decorative coating or cosmetic containing a medium according to claim 1.

7. The liquid crystalline medium of claim 1, wherein the compound of formula I is a compound of one of the following formulae I1 to I14:

| | |
|---|---|
| R¹—Phe—Phe—COO-Ment | I1 |
| R¹—Cyc—Phe—COO-Ment | I2 |
| R¹—Cyc—Cyc—COO-Ment | I3 |
| R¹—Phe—Phe—Z²—Phe—COO-Ment | I4 |
| R¹—Cyc—Phe—Z²—Phe—COO-Ment | I5 |
| R¹—Phe—Phe—Phe—COO-Ment | I6 |
| R¹—Cyc—Phe—Phe—COO-Ment | I7 |
| R¹—Cyc—Cyc—Phe—COO-Ment | I8 |
| R¹—PhePheX—COO-Ment | I9 |
| R¹—CycPheX—COO-Ment | I10 |
| R¹—PhePhe—Z²—PheX—COO-Ment | I11 |
| R¹—PheXPhe—Z²—Phe—COO-Ment | I12 |
| R¹—PhePhePheX—COO-Ment | I13 |
| R¹—PhePheXPhe—COO-Ment | I14 | wherein Ment denotes a group of the formula

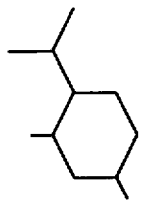

Phe denotes an unsubstituted 1,4-phenylene group, PheX denotes a 1,4-phenylene group substituted by up to four methyl groups, halogen atoms or a combination thereof, Cyc denotes 1,4-cyclohexylene and R¹ and Z² are as defined.

8. The liquid crystalline medium of claim 7, wherein the compound of formula I is of one of the formulae I9 to I14 and contains a PheX group which is 1,4-phenylene substituted by one or two halogen groups.

9. The liquid crystalline medium of claim 1, wherein R¹ is H or $C_{1-6}$-alkoxy.

10. The liquid crystalline medium of claim 1, wherein the compound of the formula I has an HTP value of less than 0.5 μm.

11. The liquid crystalline medium of claim 1 which contains 2 to 80% by weight of one or more compounds of the formula I.

12. The liquid crystalline medium of claim 1, wherein the optically inactive nematic component comprises a racemic mixture of at least one compound of one of the formulae III to VII having at least one terminal group R², R³ or R⁴, which is a chiral alkyl or alkoxy group of 4 to 16 carbon atoms.

13. An improved ink composition comprising a thermochromic liquid crystalline medium comprising at least one optically inactive nematic component and at least one optically active component, the improvement wherein the optically active component comprises at least one menthol derivative of formula I

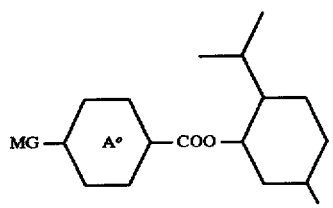

wherein

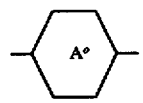

is 1,4-phenylene optionally substituted by 1 to 4 methyl groups, halogen atoms, or a combination thereof, or 1,4-cyclohexylene and MG is a group of formula II $$R^1-(A^1-Z^1)_m-A^2-Z^2- \quad (II)$$

wherein

R¹ is hydrogen or a straight-chained or branched alkyl or alkenyl group of 1 to 16 C atoms, wherein one or two nonadjacent $CH_2$ groups are optionally replaced by —O—, —S—, —CO—O— or —O—CO—, independently, A¹ and A² each independently denote:
(a) 1,4-phenylene optionally substituted by 1 to 4 fluorine atoms, in which one or two CH groups may be replaced by N,
(b) 1,4-cyclohexylene optionally substituted by —CN or —$CH_3$, in which one or two $CH_2$ groups may be replaced by O,
(c) naphthalin-2,5-diyl or piperidin-1,4-diyl, Z¹ and Z² are each independently —CO—O—, —O—CO—, —$CH_2$O—, —O$CH_2$—, —N=CH—, —CH=N—, —$CH_2CH_2$—, —C≡C— or a single bond and m is 0, 1 or 2.

14. An improved ink composition according to claim 13, wherein the optically inactive nematic medium comprises at least one compound selected from those of the formulae III to VII

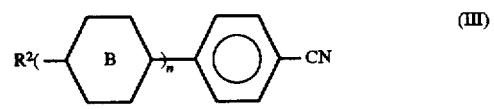

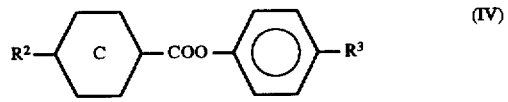

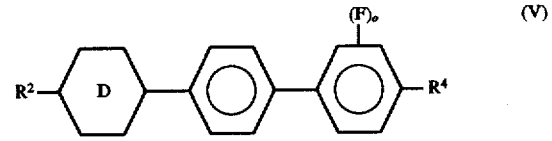

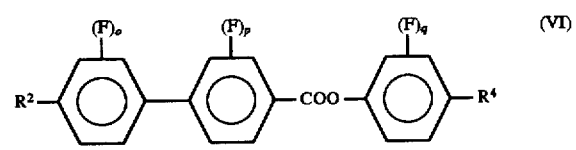

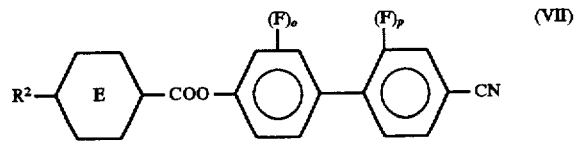

wherein

R² and R³ each independently is hydrogen or a straight-chained or branched alkyl or alkenyl group of 1–16 C atoms, wherein one or two non-adjacent $CH_2$ groups are optionally replaced by —O— —S—, —CO—O— or —O—CO—, independently, $R^4$ has one of the meanings given for $R^2$ and $R^3$ or is halogen or cyano,

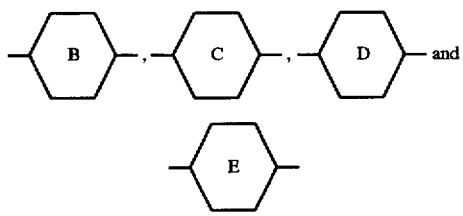

each independently denote 1,4-phenylene or 1,4-cyclohexylene, n is 1 or 2, and o, p, q are each independently 0, 1 or 2.

15. An improved composition according to claim 13, wherein said medium comprises 10–30% of at least one compound of formula I.

16. A substrate coated with a thermochromic ink according to claim 1, wherein said substrate reflects right circular polarized light and absorbs left circular polarized light.

17. A substrate coated with a thermochromic ink according to claim 1, wherein said substrate reflects left circular polarized light and absorbs right circular polarized light.

* * * * *